UNITED STATES PATENT OFFICE.

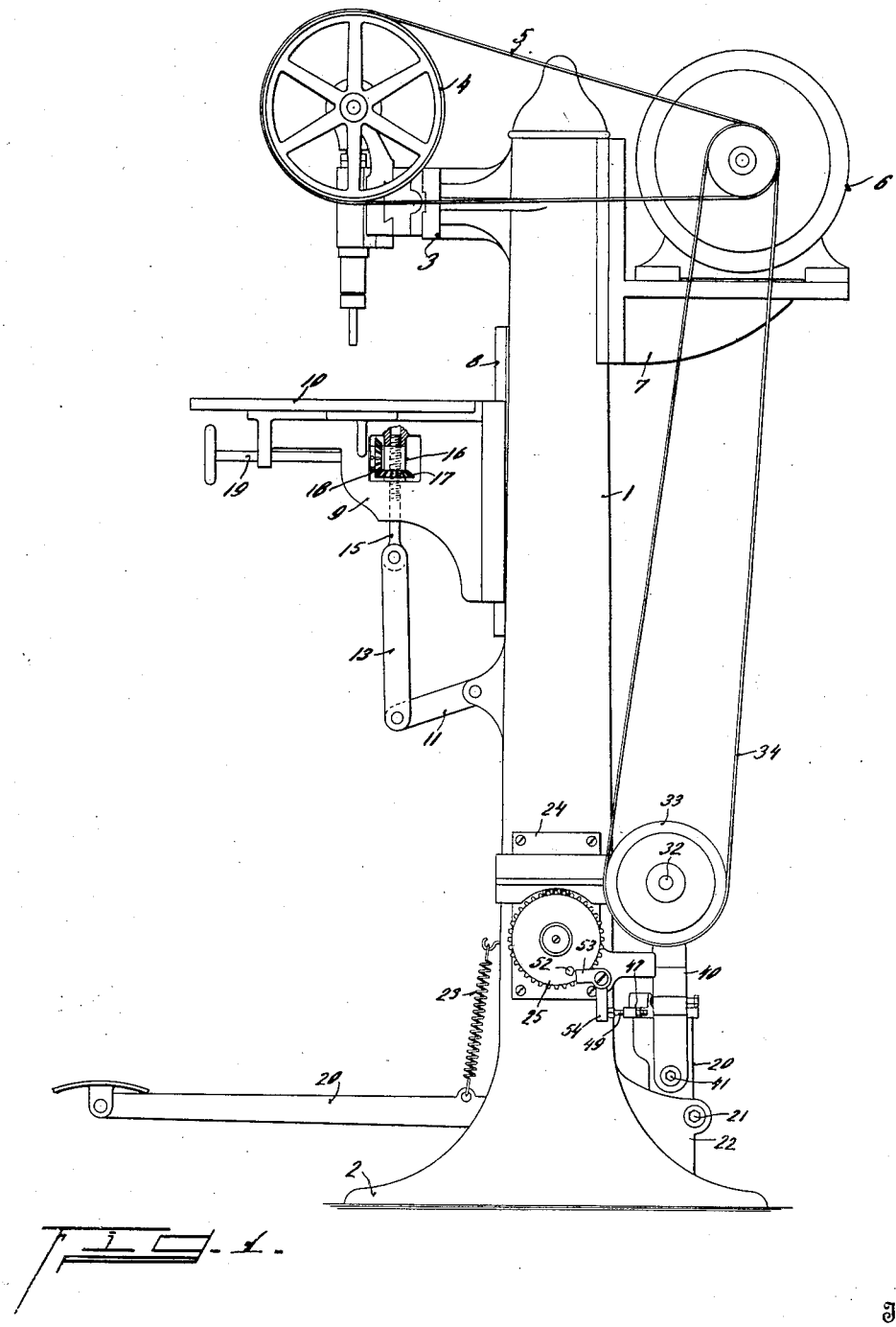

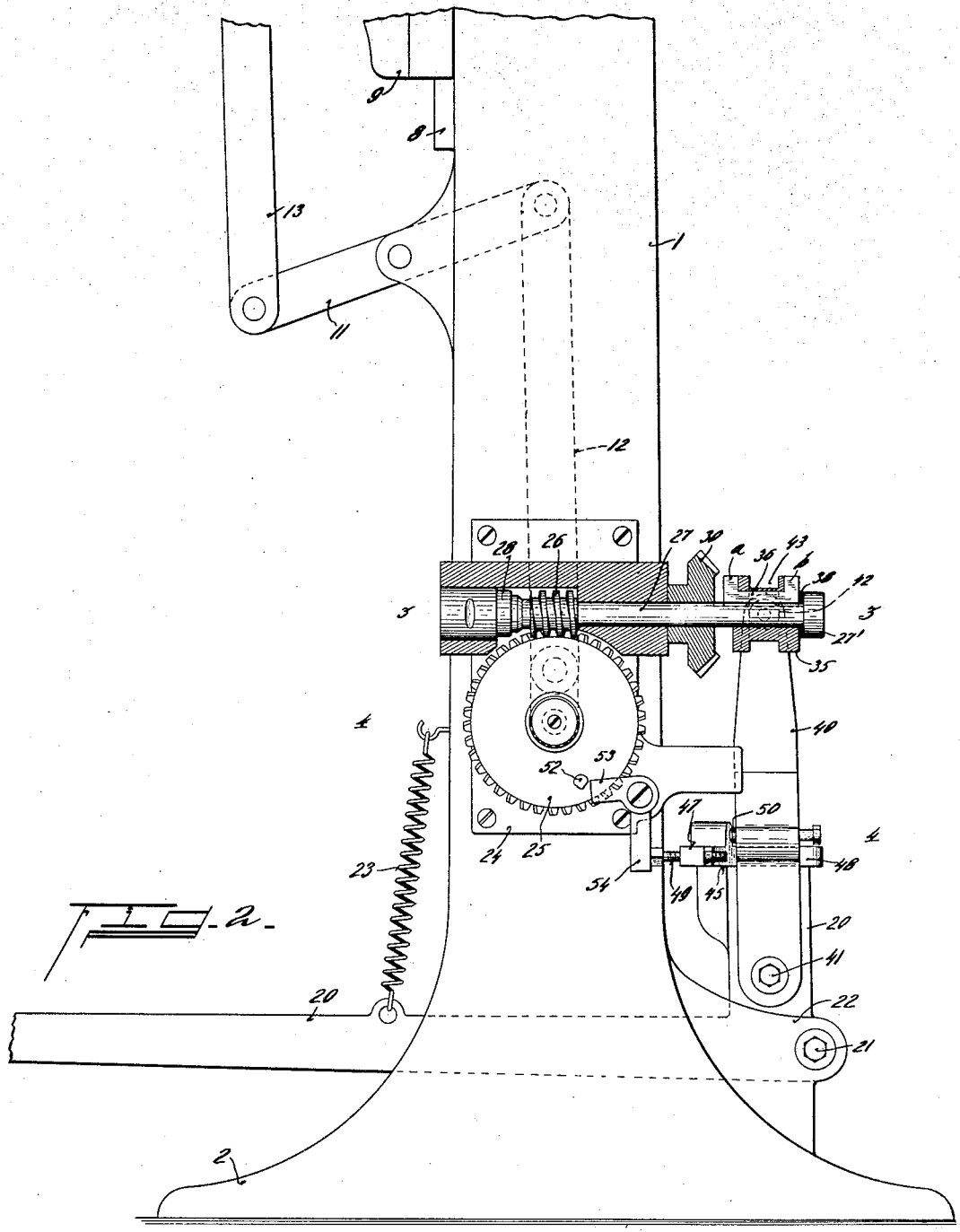

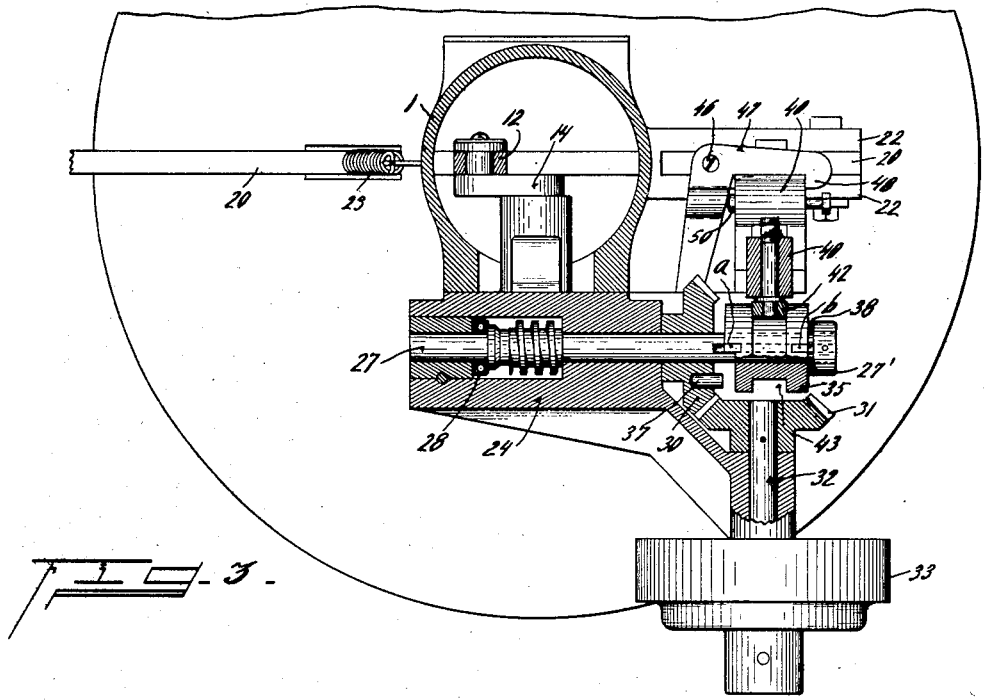
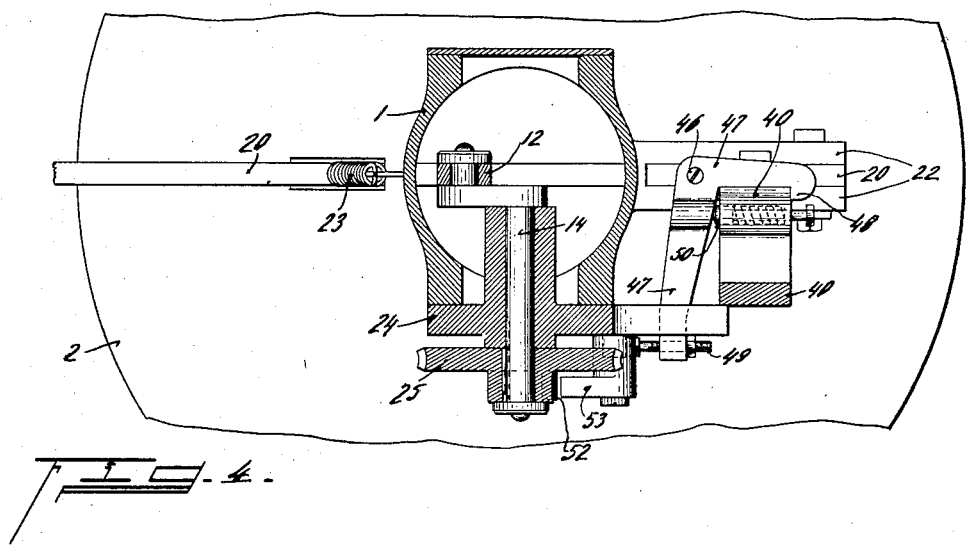

ALEXANDER DOM, OF CINCINNATI, OHIO, ASSIGNOR TO THE SAMUEL C. TATUM COMPANY, OF CINCINNATI, OHIO, A CORPORATION OF OHIO.

DRILLING-MACHINE.

1,347,214.   Specification of Letters Patent.   Patented July 20, 1920.

Application filed September 13, 1917. Serial No. 191,105.

*To all whom it may concern:*

Be it known that I, ALEXANDER DOM, a citizen of the United States, residing at 1415 Pullan avenue, Cincinnati, in the county of Hamilton and State of Ohio, have invented a new and useful Drilling-Machine, of which the following specification is a full disclosure.

My invention relates to a machine tool and primarily to a drilling machine of a class in which the work supporting table is moved toward the drill or cutting tool.

An object of the invention is to provide a machine tool with a reciprocating work supporting table, operated through power driven transmission mechanism, the transmission mechanism manually controlled and held in gear for a table translating cycle, but automatically thrown out of gear to positively stop the motion of the table at the end of a cycle, making it compulsory for the operator to bring certain manually operated parts to their normal position before a subsequent table translated cycle can be started.

Another object of the invention relates to adjusting the elevation of the work supporting table upon the table independent of the translating motions produced by power driven transmission mechanism, and to the combination of elements of the transmission mechanism for their manual and automatic control, all of which together with the advantages and features will be more fully revealed in the following description of the drawings accompanying herewith, forming a part of this specification, and in the drawings like characters of reference denote corresponding parts throughout the several views of which:

Figure 1 is a side elevation.

Fig. 2 is an enlarged side elevation of the lower base portion with some parts removed and others in section.

Fig. 3 is a plan section on line 3—3, Fig. 2.

Fig. 4 is a plan section on line 4—4, Fig. 2.

The main frame of the machine consists of a hollow upright column 1, having a supporting base flange 2 and a laterally projecting head bracket 3 on which is mounted a suitable drill spindle and spindle drive mechanism, having a drive wheel 4, driven by a belt 5, leading to a pulley of motor 6, said motor being supported upon a bracket 7 secured to the upper rear face of the column 1.

The front face of the column is provided with vertical ways 8 slidably supporting a table bracket 9 on which is secured a work table 10, adapted to be elevated to bring the work to a proper elevation relative to the drill.

The table reciprocating means comprises a rocker arm 11 pivoted on and projecting into the hollow column, its inner end pivotally connected to a link 12 and its opposite end to a link 13. The lower end of the link 12 is pivotally connected to the crank arm of a horizontal crank shaft 14. The upper end of the link 13 is pivotally connected to a push rod 15 slidably mounted within a bore in the table bracket 9. The upper end of said rod is threaded to receive a nut 16 which engages and sustains the table bracket. The nut, integrally, is provided with a beveled pinion 17 meshing with a companion beveled gear 18, secured to the inner end of an adjusting rod 19. To adjust the zone of table reciprocation relative to the drill head, the rod 19 is manipulated to translate the nut 16 on the push rod 15.

The drive mechanism for the table is supported on the lower portion of the column and is controlled by a foot treadle 20 which is pivoted at 21 between a pair of ears 22 projecting rearwardly and upwardly from the column and base, said treadle extending forwardly through a slot in the column wall and normally held in elevated position by a spring 23.

The horizontal crank shaft 14 is journaled in a bracket 24 secured to the column. A worm wheel 25 is fixed to the outer end of shaft 14 meshing with a worm pinion 26 fixed to a drive shaft 27. The drive shaft 27 is journaled in the bracket 24 and is provided with a suitable end-thrust bearing 28. A beveled pinion 30 is loosely journaled upon the shaft 27 and meshes with a beveled pinion 31 fixed to a power shaft 32 journaled in the bracket 24 at right angles to the shaft 27 and provided at its outer end with a drive pulley 33 in driving connection with the motor and through a belt 34. A collar 27' is fixed to the outer end of the drive shaft 27 and intermediate this collar and the beveled pinion 30 is positioned a slidable clutch sleeve 35 splined to said shaft by a key 36. Said key comprises the body portion 36 and end projections *a* and *b*, the inner projection *a* forming a driving abutment, adapted, when the clutch sleeve is shifted toward the pinion 30 to engage a stud 37 projecting from the face of the pinion 30. A fiber washer 38 faces the collar 27' and contributes to a substantially noiseless clutch release. The clutch sleeve 35 is controlled by a clutch lever 40, pivoted at 41 on the foot treadle 20 and provided at its upper end with a roller 42 projecting horizontally into a groove 43 in the clutch sleeve. The rear end of the foot treadle 20 extends upwardly, providing a horizontal table surface 45 upon which is pivoted at 46 a bell crank latch lever 47 having a rearwardly projecting hooked end 48 engaging over the rear edge of the clutch lever 40 and a laterally projecting trip end provided with an adjusting screw 49. A spring plunger 50 positioned within a bore in the clutch lever 40 contacts with the inner surface of the latch lever 47, (see Fig. 4) to impel said lever toward normal latching position. This latch mechanism serves, primarily, to connect the foot treadle 20 and clutch lever 40, so that they operate as a unit to shift the clutch sleeve 35 and as long as the operator depresses the foot treadle the clutch sleeve will, until automatically thrown out, be shifted toward the pinion 30, engaging the stud 37 to operatively connect the power shaft 32 and drive shaft 27. Under these conditions the table reciprocating mechanism will operate to reciprocate the table a complete stroke upwardly and downwardly unless the foot treadle is sooner released and normalized by the normalizing spring 23.

To provide for an automatic clutch release at the end of each complete reciprocation, I provide a trip mechanism, operating to trip the trip lever 47 to break the unitary connection between the foot treadle and clutch lever.

The worm wheel 25 makes one complete revolution for each table reciprocation and is provided with a trip stud 52 positioned to engage and rock a bell crank lever 53 pivoted on the bracket 24 and provided with a downwardly projecting arm 54 which contacts with the adjusting screw 49 of the trip lever 47.

Assuming that the operator has depressed the foot treadle 20 to throw in the clutch, the trip stud 52 traveling in a clockwise direction, will rock the bell crank lever 53 at the end of a table reciprocation. This will rock the trip lever 47 to disengage its hooked end 48 from the edge of the clutch lever 40 and the spring plunger 50 acting against the trip lever, as an abutment, will automatically rock the clutch lever to throw out the clutch.

When the foot treadle is released and is normalized by the spring 23, the clutch lever 40 and trip lever 47 again assume their normal interlocked positions.

This mechanism provides a spring normalized clutch operating foot treadle and clutch lever normally interlocked for unitary operation and an automatic clutch release controlled by the table reciprocation to trip the interlock while the treadle is depressed.

Under normal conditions with the power table elevating mechanism at rest, the clutch lever 40 is connected with the treadle 20 which provides for clutching gear 30 with shaft 27 upon depressing the treadle 20.

Now, assuming that the operator has depressed the treadle 20 connecting the shaft 27 with the gear 30, the gear 25 will be set in motion for raising and lowering the table in one cycle of said gear 25. The strip stud 52 projects from the gear 25 and moves with the gear in clockwise direction and will, toward the end of each revolution, be brought into engagement with the bell crank lever 53 and thereby rock said lever 53, which in turn rocks the trip lever 47 releasing its hook engagement with the clutch actuating lever 40.

The clutch actuating lever 40 when thus released is moved by the pressure of the spring actuated plunger 50, beyond any relatching by the trip lever 47 until the foot pressure upon the treadle 20 is released. Thus the connection between the treadle and clutch actuating lever 40 is positively broken at the end of each return motion of the table requiring a release of the treadle to again reëngage the clutch actuating lever 40 for a subsequent table translating cycle.

Having described my invention, I claim:

1. A transmission mechanism comprising a driving member, a driven member, a sliding clutch for connecting said driving and driven members, a clutch operating lever, a treadle lever pivotally supporting said clutch operating lever, and a latch member carried by said treadle lever for unitarily connecting said lever, whereby the clutch may be operated by said treadle lever.

2. A transmission mechanism comprising a driving member, a driven member, a sliding clutch for connecting said driving and driven members, a clutch operating lever, a treadle lever pivotally supporting said clutch operating lever, a latch member carried by said treadle lever for unitarily connecting said lever, whereby the clutch may be operated by said treadle lever, and means transmittingly connected with said driven member for actuating said latch member to release said clutch operating lever for controlling said clutch independent of the treadle control.

3. A transmission mechanism comprising a driving member, a driven member, a clutch for transmittingly connecting said driving and driven members, a swinging clutch operating lever, a manually operated lever pivotally supporting said clutch operating lever, a latch member for connecting said lever to operate as a unit, and tension means for said clutch operating lever for automatically operating said lever and clutch in one direction when the unity of said levers is broken.

4. A transmission mechanism comprising a driving member, a driven member, a clutch for transmittingly connecting said driving and driven members, a swinging clutch operating lever, a manually operated lever pivotally supporting said clutch operating lever, a latch member for connecting said lever to operate as a unit, tension means for said clutch operating lever for automatically operating said lever and clutch in one direction when the unity of said levers is broken, and means in driven connection with said driven member for tripping said latch member when said clutch is in its operative position.

In witness whereof I hereunto subscribe my name as attested by the two subscribing witnesses.

ALEXANDER DOM.

Witnesses:
M. SMITH,
L. A. BECK.